(12) United States Patent
Lynn et al.

(10) Patent No.: US 8,848,104 B2
(45) Date of Patent: *Sep. 30, 2014

(54) WHIP ANTENNA FOR MOBILE COMMUNICATION DEVICES

(75) Inventors: Lapoe Lynn, Los Altos, CA (US); Hongbin Tong, Fremont, CA (US)

(73) Assignee: Telegent Systems, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/328,561

(22) Filed: Dec. 16, 2011

(65) Prior Publication Data

US 2012/0188450 A1 Jul. 26, 2012

Related U.S. Application Data

(60) Provisional application No. 61/424,607, filed on Dec. 17, 2010.

(51) Int. Cl.
| | |
|---|---|
| H04N 7/00 | (2011.01) |
| H04B 1/38 | (2006.01) |
| H01Q 21/28 | (2006.01) |
| H01Q 1/46 | (2006.01) |
| H01Q 9/30 | (2006.01) |
| H01Q 1/24 | (2006.01) |

(52) U.S. Cl.
CPC .............. *H04B 1/3805* (2013.01); *H01Q 21/28* (2013.01); *H01Q 1/46* (2013.01); *H01Q 9/30* (2013.01); *H01Q 1/243* (2013.01)
USPC ...... 348/552; 348/725; 455/556.1; 455/575.6

(58) Field of Classification Search
USPC .............. 348/552, 725–734; 455/556.1, 575.5
See application file for complete search history.

(56) References Cited

U.S. PATENT DOCUMENTS

2009/0096685 A1* 4/2009 Harano .................. 343/702

FOREIGN PATENT DOCUMENTS

| JP | 06-053720 A | 2/1994 |
|---|---|---|
| JP | 2007-150861 A | 6/2007 |
| JP | 2009-182797 A | 8/2009 |
| JP | 2009272947 A | * 11/2009 |
| KR | 10-2005-0052702 A | 6/2005 |

OTHER PUBLICATIONS

International Search Report for PCT/US2011/065645 filed on Dec. 16, 2011.
Written Opinion of the International Searching Authority for PCT/US2011/065645 filed on Dec. 16, 2011.

* cited by examiner

*Primary Examiner* — Michael Lee
(74) *Attorney, Agent, or Firm* — Richard T. Ogawa; Ogawa P.C.

(57) ABSTRACT

Embodiments of the present invention provide a solution for integrating a headset antenna and whip antenna together as a combined antenna for a mobile TV application. In certain embodiments, the invention can be applied to portable devices for both analog TV, FM radio, and digital TV applications and can be applied more generally to any wireless system which spans a broad frequency range, where the antenna gain of two antennas together can exceed the performance of either alone. In a preferred embodiment, the present invention provides a connector module that is configured to connect to both a whip antenna and a headset antenna while providing necessary electrical and signal isolation. The isolation can be accomplished by using a plurality of filters. There are other embodiments as well.

20 Claims, 3 Drawing Sheets

WHIP ANTENNA FOR MOBILE COMMUNICATION DEVICES

CROSS-REFERENCES TO RELATED APPLICATIONS

This application claims priority from U.S. Provisional Patent Application No. 61/424,607, filed Dec. 17, 2010, which is incorporated by reference here in for all purposes.

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention is directed to mobile devices. More specifically, embodiments of the present invention provide one or more antennas used for mobile devices.

In recent years, portable communication devices, such as mobile phone, tablet computers, personal digital assistants, have become ubiquitous. Many people carry their cellular phones with them for their daily activities. The functions of these portable communication devices grew from voice communication, texting, and personal information management to games, social networking, multimedia entertainment, and others.

One use of portable communication devices has been watching videos and/or other multimedia contents. For example, to watch videos on a cell phone, the user can (1) preload the video content onto the cell phone; (2) stream the video over the data network; or (3) receive video/television broadcast signals over the air.

There are pros and cons with each of the options above. But it is to be appreciated that playback television broadcast signals is an attractive option, where available, for both users and network service providers. This is because users are able to watch fresh contents without congesting the data network.

Over the past, various types of mobile devices, such as mobile phones, have been proposed to receive television broadcasting. One of the challenges for those products is to have an antenna that is capable of receiving good signals and at the same time portable.

Therefore, it is desirable to have new techniques for RF reception of mobile devices.

SUMMARY OF INVENTION

Embodiments of the present invention provide a solution for integrating a headset antenna and whip antenna together as a combined antenna for a mobile TV application. In certain embodiments, the invention can be applied to portable devices for both analog TV, FM radio, and digital TV applications and can be applied more generally to any wireless system which spans a broad frequency range, where the antenna gain of two antennas together can exceed the performance of either alone. In a preferred embodiment, the present invention provides a connector module that is configured to connect to both a whip antenna and a headset antenna while providing necessary electrical and signal isolation. The isolation can be accomplished by using a plurality of filters. There are other embodiments as well.

In an exemplary embodiment, the present invention provides a mobile device that can be used as a cellular phone and a mobile television. The mobile device comprises a connector module that is connected to a whip antenna that is a part of the mobile device and a headset jack for connecting to a mobile headset. Through the connector module, the mobile device can receive RF signals from the headset and/or the whip antenna without unwanted interference. The connector module comprises multiple filters to isolate different signals, which include RF signals, audio signals, and others.

According to an embodiment, the present invention provides a mobile device. The device includes a processor. The device also includes a wireless communication module that is configured to connect to one or more wireless communication networks. The device additionally includes a display module that is coupled to the processor. The device also includes a mobile television module for processing television signals and send signals to the display module through a display bus. The device also includes an audio processing module for processing audio signals. The device further includes a whip antenna being configured to operate at two or more lengths. The whip antenna is characterized by a length of about 80 mm to 180 mm. The device additionally includes a connection housing that is disengageably coupled to a headset. The headset comprises a first audio cable that is associated with a first frequency range. The whip antenna is associated with a second frequency range. The first frequency range includes an RF broadcast frequency. The first frequency range and the second frequency range are different. The device further includes a connector module electrically coupled to the connection housing. The connector module is configured to separate television signals from audio signals. The connector module is configured to receive the television signals from the whip antenna and transmit the television signals to the mobile television module. The connector module is also configured to receive the audio signals from the audio processing module and send the audio signals to the one or more audio cables. The connector module is positioned at least 10 mm away from the processor.

According to another embodiment, the present invention provides a mobile device. The device includes a processor. The device also includes a wireless communication module for connecting to one or more wireless communication networks. The device additionally includes a mobile television module for processing television signals and sending signals to the display module through a display bus. The device includes an audio processing module configured to process audio signals. The device additionally includes a whip antenna being configured to operate at two or more lengths of about 80 mm to 180 mm. The device further includes a connection housing that is disengageably coupled to a headset. The headset comprises a first audio cable. The audio cable is associated with a first frequency range. The whip antenna is associated with a second frequency range. The first frequency range includes an RF broadcast frequency. The first frequency range and the second frequency range are different. The device additionally includes a connector module electrically coupled to the connection housing. The connector module includes a plurality of filters. The connector module is configured to separate television signals from audio signals. The connector module is configured to receive the television signals from the whip antenna and transmit the television signals to the mobile television module. The connector module is configured to receive the audio signals from the audio processing module and send the audio signals to the one or more audio cables. The connector module is positioned at least 10 mm away from the processor.

According to yet another embodiment, the present invention provides a battery module and a memory module. The device also includes a processor electrically connected to the battery module. The device includes a wireless communication module for connecting to one or more wireless communication networks. The device includes a mobile television module for processing television signals and send signals to the display module through a display bus. The device includes an audio processing module configured to process audio signals. The device includes a whip antenna being configured to operate at two or more lengths. The whip antenna can have a length of about 80 mm to 180 mm. The device also includes a connection housing that is disengageably coupled to a headset. The headset includes a first audio cable that is associated with a first frequency range. The whip antenna is associated with a second frequency range. The first frequency range includes an RF broadcast frequency. The first frequency range and the second frequency range are different. The device also includes a connector module electrically coupled to the connection housing. The connector module comprises a plurality of ferrite bead elements. The connector module is configured to separate television signals from audio signals. The connector module is configured to receive the television signals from the whip antenna and transmit the television signals to the mobile television module. The connector module is configured to receive the audio signals from the audio processing module and send the audio signals to the one or more audio cables. The connector module is positioned at least 10 mm away from the processor.

It is to be appreciated that embodiments of the present invention provide numerous advantages over conventional techniques. More specifically, by capable of receiving signals from both headset and whip antenna, a mobile device according to the present invention is capable of receiving good reception for a wide range frequency and many different sets of protocols. In addition, with various filtering components, embodiments of the present invention provide solutions for interference problems commonly associated with mobile devices. Furthermore, embodiments of the present invention are compatible with conventional systems. There are other benefits as well.

BRIEF DESCRIPTION OF THE INVENTION

DETAILED DESCRIPTION OF THE INVENTION

Figure 1:
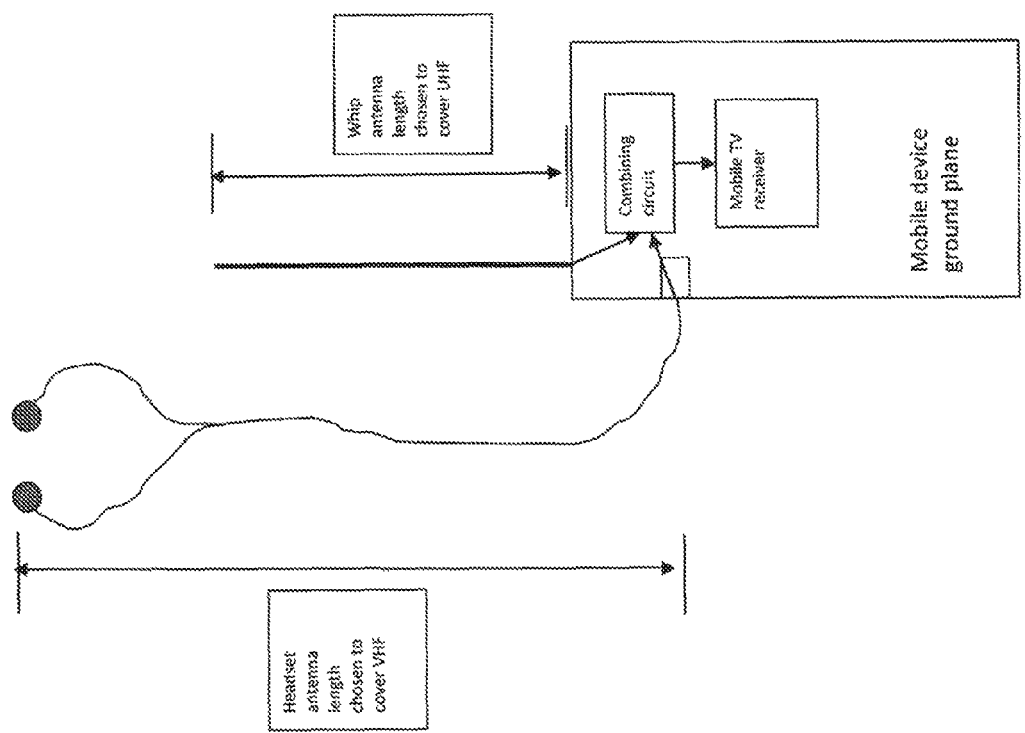
FIG. 1 is a simplified diagram illustrating integrating two or more antennas are used in a mobile device application according to embodiments of the present invention.

Embodiments of the present invention provide a solution for integrating a headset antenna and whip antenna together as a combined antenna for a mobile TV application. In certain embodiments, the invention can be applied to portable devices for both analog TV, FM radio, and digital TV applications and can be applied more generally to any wireless system which spans a broad frequency range, where the antenna gain of two antennas together can exceed the performance of either alone. In a preferred embodiment, the present invention provides a connector module that is configured to connect to both a whip antenna and a headset antenna while providing necessary electrical and signal isolation. The isolation can be accomplished by using a plurality of filters. There are other embodiments as well.

Often, a whip antenna is used for TV enabled mobile phones. In contrast, most phones that use stand-alone FM radio chipsets rely on the headset to function as the FM antenna. Thus it is to be appreciated that embodiments of the present invention provide an integrated design that combines the benefit and advantages of both a longer wire antenna (headset) and a short wire antenna (whip) that respectively receive different signals. Among other things, the integrated design can improve TV and FM received sensitivity performance in the lower frequency bands (VHF1, FM and VHF-band3) relative to a whip-antenna-only solution.

In the last few years, mobile TV products have emerged. Mobile TV products are capable of receiving and displaying analog TV, FM radio, and digital TV (e.g. DVB-H, DVH-T, ISDB-T, CMMB and ATSC) signals on a handheld device, such as mobile phone, PDA, and other types of portable devices. Most mobile TV products use a short whip antenna as the antenna for the TV receiver. However, because the realized gain of the antenna can limit the SNR that the receiver sees, it directly affects the TV performance metrics such as sensitivity level and picture quality.

The TV broadcast frequency range is extremely wide and it contains VHF1, VHF2 (ITU-band3) and UHF bands, which covers from 48 MHz to 860 MHz. For a single whip antenna, which typically has its peak gain near its resonant frequency (for example, where the whip's physical length is equal to a quarter of a wavelength ($\lambda/4$)), it is very difficult to provide high antenna gain across the entire frequency range. As a result, the whip antenna is optimized for a relatively small frequency range. For example, a 15 cm whip antenna works well for the UHF band, but has lower-than-optimal gain in the VHF bands. Similarly, a whip antenna optimized for VHF bands typically offers poor reception for UHF band signals.

A headset, or so-called earphone, is used as the FM radio antenna in some applications. For example, a headset with embedded antennas is described in U.S. Provisional Application No. 61/424,613, filed 17 Dec. 2010, which is incorporated by reference herein for all purposes. Optimized for headset usability, the length of headset antenna is much typical longer than whip antennas, typically at 90 cm to 150 cm long. As mentioned above, different antenna lengths correspond to different frequency ranges. The optimal antenna gain for such the above mentioned antenna length is in the VHF bands (e.g., 48 MHz to 230 MHz). However, because the gain varies a lot in the UHF band, such length is not a suitable for the UHF band (e.g., 470 MHz to 860 MHz).

Various embodiment of the invention address how to integrate a headset antenna and whip antenna together as a combined antenna for a mobile TV application. Aspects of the invention are useful for portable devices for both analog (e.g., TV, FM radio) and digital TV applications. In addition, embodiments of the present invention can be applied more generally to other types of wireless systems that span a broad frequency range where the antenna gain of two antennas together exceeds the performance of either alone.

As aforementioned, a whip antenna often is used for TV-enabled mobile phones, while most phones using stand-alone FM radio chipsets rely on the headset to function as the FM antenna. Both the whip antenna and the headset antenna act predominantly as electric monopoles referenced to the ground plane of the mobile device (e.g., handset, cellphone, or other). Antennas used in this mode tend to have a local maximum in antenna gain for frequencies where the wavelength of the signal is close to 4× times the length of the monopole element (and thus, the prevalence of the common ¼ wavelength monopole antenna). While matching techniques may be applied to move the local maximum away from the 4× relationship, there will still be a local maximum where the antenna gain and bandwidth will decrease as the frequency is moved away from the optimum point. Typically, the degradation in antenna performance becomes increasingly large as the frequency deviates from the optimum frequency.

However, there may be other local maxima near certain multiples of the optimum frequency (eg. 3× the optimum). Therefore, it is very difficult to use a single electric monopole antenna to cover the broadcast TV frequency range of 48 MHz to 860 MHz with good antenna gain throughout. For example, a 1.3 m long monopole antenna (typical for many headset antennas) can have local maxima near 57.5 MHz, 173 MHz and 460 MHz (e.g., antenna is ¼×, ¾×, or 9⁄4×λ), but may have poor performance near 577 Mhz and 805 Mhz (antenna is 2.5×λ and 3.5×λ). On the other hand, a 15 cm long monopole antenna (typical for many whip antennas implementations) will have best performance near 500 MHz (¼× λ), but worse performance in VHF (50-200 MHz), because the antenna length is much shorter than λ/4 for the frequency and the antenna gain decreases with (1/λ).

Embodiments of the present invention provide a cost-effective PCB modification that combines the benefits of both the headset and whip antennas. The whip antenna and headset antenna may be used simultaneously, thereby allowing the headset antenna to provide reception in the VHF bands, while the whip provides good reception in the UHF band. A low pass filter can be added between headset and whip antenna, which prevents the whip antenna performance degradation due to headset interference for UHF band.

FIG. 1 is a simplified diagram illustrating integrating two or more antennas are used in a mobile device application according to embodiments of the present invention. This diagram is merely an example, which should not unduly limit the scope of the claims. One of ordinary skill in the art would recognize many variations, alternatives, and modifications. As shown in FIG. 1, a mobile device comprises a combining circuit that connects to both a headset antenna and a whip antenna. For example, the headset antenna is optimized (e.g., having a predetermined length) for receiving VHF signals; the length of the whip antenna is specialized for receiving UHF and/or other signals. Since mobile devices typically have limited internal space to accommodate various electrically components and electronics, it is desirable to have a single combining circuit to connect both the headset and the whip antenna.

Embodiments of the present invention provide a circuitry as described below that effectively combines the headset and whip antennas onto the TV input port. In addition, the circuitry provides a duplexing function to separate the audio signal from the RF signal on the headset cable. If the headset is not plugged into the circuit, the mobile device automatically selects the whip antenna receiving signals of all frequencies.

In various embodiments, connector circuit as shown is insulated and spaced away from other electrically components and electronics of the mobile device to avoid and minimize interference. In a preferred embodiment, the connector circuit is positioned within a peripheral region of the mobile device, where the connector circuit is in close proximity to both headset connector and the whip antenna connector. The connector circuit comprises multiple signal paths, which can be insulated from one another as needed, that are connected to various components, such as mobile TV receiver, audio processor, controller, and/or other components. For example, these signal paths can be for switching signals, clocks, memory bus, display cables, DC-DC switching converters, and others.

In FIG. 1, the connectors for whip antenna and the headset are located in close proximity. In an alternative embodiment where the headset connector and the whip antenna contact are positioned far from each other, a 50 ohms trace is used to connect them. More specifically, the trace is positioned away from various signal paths listed above.

Figure 2:
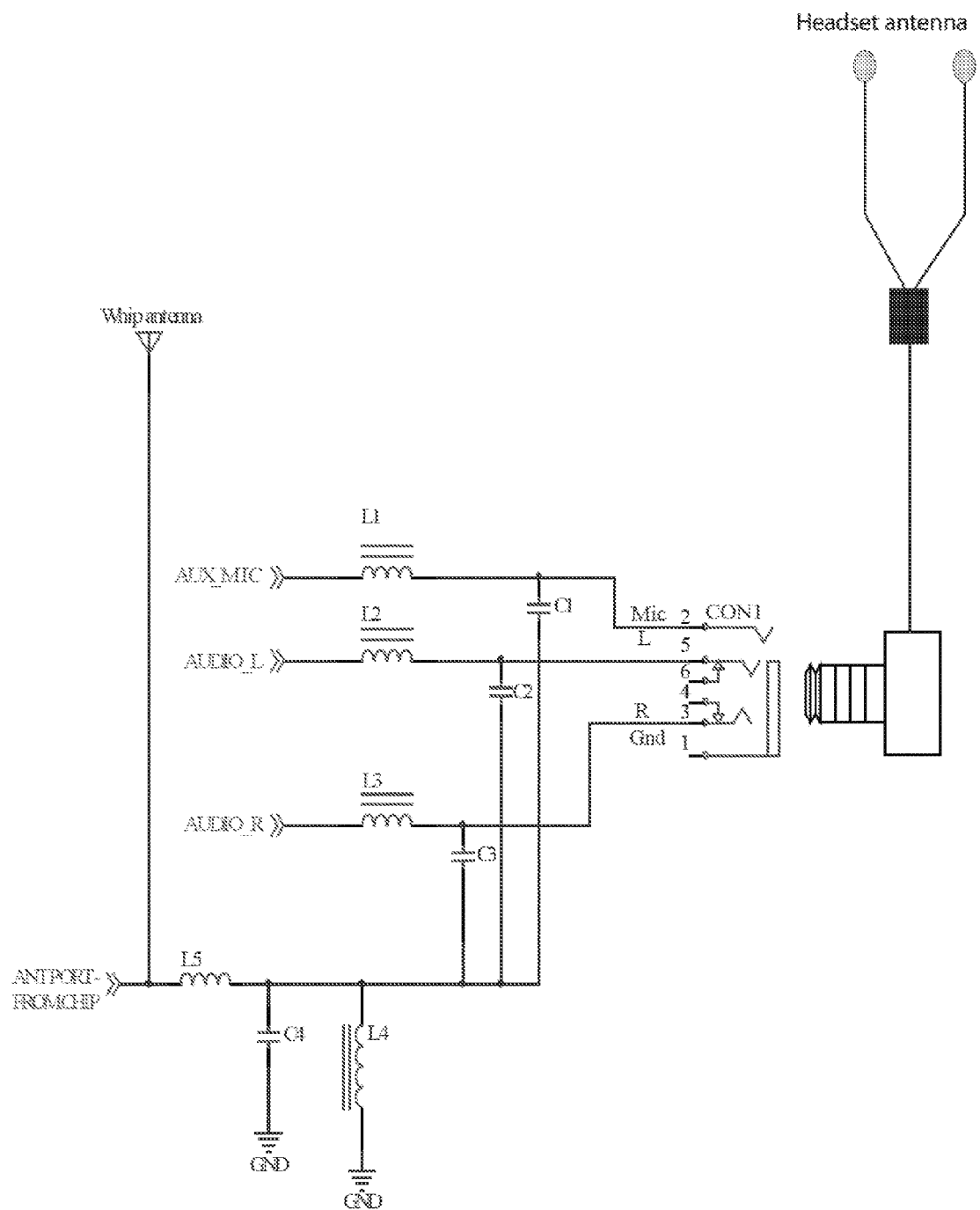
FIG. 2 is a simplified schematic diagram showing an example of a combining circuit to integrate both headset and whip antennas according to embodiments of the present invention.

FIG. 2 is a simplified schematic diagram showing an example of a combining circuit to integrate both headset and whip antennas according to embodiments of the present invention. This diagram is merely an example, which should not unduly limit the scope of the claims. One of ordinary skill in the art would recognize many variations, alternatives, and modifications. The CON1 as shown is the connector for accommodating a headset connector. As explained above, the headset is used both for audio connection and as part of the Mobile TV antenna. Depending on the application, the headset connector can be in various physical sizes. For example, the CON1 is a female connector that accommodates a headset male connector, which comprises a standard 2.5 mm or 3.5 mm audio/microphone jack.

In another example, the connector CON1 comprises a female housing for connecting to a male mini-USB or a micro-USB connector of the headset. As shown in FIG. 2, CON1 comprises a number of electrical connections and is adapted to connect the phone PCB to the headset cable. In this example, a standard audio jack is shown. There are 4 signals to consider in this example—L (audio left), R (audio right), Mic (microphone), and Gnd (ground). It is to be appreciated that other configurations are possible as well. In a specific embodiment, for connecting to a headset where more signals are to be received, (i.e., there are more than these 4 signals inside the headset cable, such as FM signals), a ferrite-bead—capacitor pair is (e.g., L1 & C1) is used for each of the additional signals. For example, L1 thru L4 are ferrite beads for passing the low frequency (audio) signals; C1 thru C3 are capacitors for passing ATV RF signal received by the headset; C4 and L5 are the low pass filter. It is to be appreciated that other configurations are possible as well.

Figure 3:
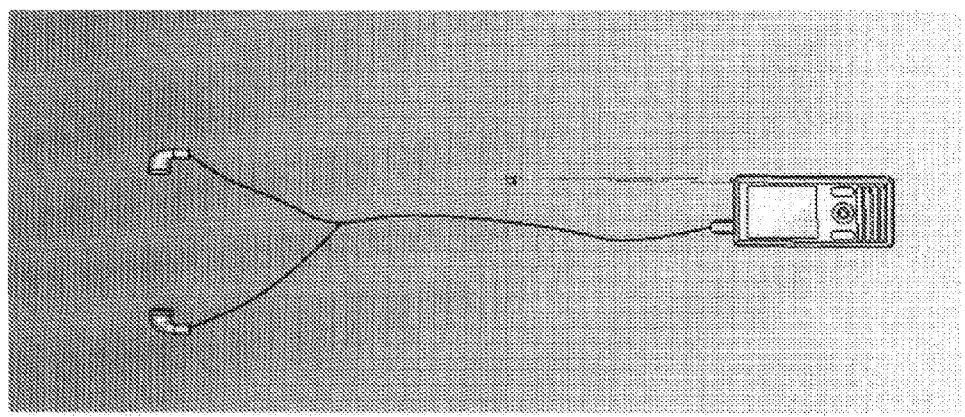
FIG. 3 is simplified diagram illustrating a whip antenna implemented on a mobile TV phone according to embodiments of the present invention.

As shown in FIG. 3, signal paths (e.g., L, R, Mic, Gnd, TV) are insulated from one another by means of one or more inductor and capacitor components. In a specific embodiment, capacitors C1, C2, and C2 are characterized by a capacitance of around 270 pF, ranging from 200 pF to 350 pF. The inductive elements L1, L2, L3, and L4 are specifically and respectively correspond to the characteristics of various capacitors and desirable filtering band. As mentioned above, ferrite bead type of components is used for the inductive elements. Among other things, a ferrite bead employs a mechanism of high dissipation of high frequency currents in a ferrite to build high frequency noise suppression devices. In alternative embodiments, other filtering components can be used in lieu of or in conjunction with the components shown in FIG. 3.

As shown in FIG. 2, there are multiple ground connections: both the capacitor C4 and the inductive element L4 are grounded. In various embodiments, the ground connection of the printed circuit board is insulated from the audio jack and audio jack ground by the inductive element L4 (e.g., ferrite bead).

FIG. 3 is simplified diagram illustrating a whip antenna implemented on a mobile TV phone according to embodiments of the present invention. This diagram is merely an example, which should not unduly limit the scope of the claims. One of ordinary skill in the art would recognize many variations, alternatives, and modifications. As shown in FIG. 3, the headset is connected to the mobile device while the whip antenna is also used. In various embodiments, the headset and whip antenna work together in various modes. In one mode, the whip antenna receives broadcast signal over the air and the headset simply operates to provide a path for audio signals without receiving radio signals. In another mode, the whip antenna and the headset work together in receiving signals, while the headset also provides audio signals to the user. In yet another mode, both the whip antenna and the headset function as antenna for receiving signals, while sound is transmitted from speaker(s) of the mobile device without going through the headset.

As shown in FIG. 3, the mobile device comprises, among other components, a screen and a keypad. For example, the screen is an LCD screen controlled by a display control unit or a GPU. The keypad is controlled by an I/O controller. The mobile device comprises an internal controller for operating various components, such as processing the received broadcast signals, removing noises, processing video signals, and others.

According to an embodiment, the present invention provides a mobile device. The device includes a processor. The device also includes a wireless communication module that is configured to connect to one or more wireless communication networks. The device additionally includes a display module that is coupled to the processor. The device also includes a mobile television module for processing television signals and send signals to the display module through a display bus. The device also includes an audio processing module for processing audio signals. The device further includes a whip antenna being configured to operate at two or more lengths. The whip antenna is characterized by a length of about 80 mm to 180 mm. The device additionally includes a connection housing that is disengageably coupled to a headset. The headset comprises a first audio cable that is associated with a first frequency range. The whip antenna is associated with a second frequency range. The first frequency range includes an RF broadcast frequency. The first frequency range and the second frequency range are different.

The device further includes a connector module electrically coupled to the connection housing. The connector module is configured to separate television signals from audio signals. The connector module is configured to receive the television signals from the whip antenna and transmit the television signals to the mobile television module. The connector module is also configured to receive the audio signals from the audio processing module and send the audio signals to the one or more audio cables. The connector module is positioned at least 10 mm away from the processor. The device may further include a shielding can enclosing the audio processing module.

The connector housing can be connected to the headset in various ways. For example, The connector housing can be configured to accommodate a USB connector. The connector housing can also be configured to accommodate a 2.5 mm or 3.5 mm jack connector.

As an example, the device is a mobile device that includes an LCD display coupled to the display module.

Various components of the device are insulated from the connector module. For example, the device further includes a memory module that is insulated from connector module.

Also, the connector module comprises one or more isolating elements. The one or isolating elements may include one or more ferrite beads. The connector module may also comprise at least a shield trace electrically connecting the audio cables and the whip antenna. The shield trace has an impedance of about 50 ohms, but it is to be appreciated that other impedance level are possible as well.

Depending on the application, the grounding of the connector module can be very important. For example, the connection housing is electrically coupled to a first ground and a PCB of the mobile device is electrically coupled to a second ground. The first ground and the second ground are insulated from each other.

According to another embodiment, the present invention provides a mobile device. The device includes a processor. The device also includes a wireless communication module for connecting to one or more wireless communication networks. The device additionally includes a mobile television module for processing television signals and sending signals to the display module through a display bus. The device includes an audio processing module configured to process audio signals. The device additionally includes a whip antenna being configured to operate at two or more lengths of about 80 mm to 180 mm. The device further includes a connection housing that is disengageably coupled to a headset. The headset comprises a first audio cable. The audio cable is associated with a first frequency range. The whip antenna is associated with a second frequency range. The first frequency range includes an RF broadcast frequency. The first frequency range and the second frequency range are different. The device additionally includes a connector module electrically coupled to the connection housing. The connector module includes a plurality of filters. The connector module is configured to separate television signals from audio signals. The connector module is configured to receive the television signals from the whip antenna and transmit the television signals to the mobile television module. The connector module is configured to receive the audio signals from the audio processing module and send the audio signals to the one or more audio cables. The connector module is positioned at least 10 mm away from the processor.

According to yet another embodiment, the present invention provides a battery module and a memory module. The device also includes a processor electrically connected to the battery module. The device includes a wireless communication module for connecting to one or more wireless communication networks. The device includes a mobile television module for processing television signals and send signals to the display module through a display bus. The device includes an audio processing module configured to process audio signals. The device includes a whip antenna being configured to operate at two or more lengths. The whip antenna can have a length of about 80 mm to 180 mm. The device also includes a connection housing that is disengageably coupled to a headset. The headset includes a first audio cable that is associated with a first frequency range. The whip antenna is associated with a second frequency range. The first frequency range includes an RF broadcast frequency. The first frequency range and the second frequency range are different. The device also includes a connector module electrically coupled to the connection housing. The connector module comprises a plurality of ferrite bead elements. The connector module is configured to separate television signals from audio signals. The connector module is configured to receive the television signals from the whip antenna and transmit the television signals to the mobile television module. The connector module is configured to receive the audio signals from the audio processing module and send the audio signals to the one or more audio cables. The connector module is positioned at least 10 mm away from the processor.

It is to be appreciated that embodiments of the present invention provide numerous advantages over conventional techniques. More specifically, by capable of receiving signals from both headset and whip antenna, a mobile device according to the present invention is capable of receiving good reception for a wide range frequency and many different sets of protocols. In addition, with various filtering components, embodiments of the present invention provides solutions for interference problems commonly associated with mobile devices. Furthermore, embodiments of the present invention are compatible with conventional systems. There are other benefits as well.

There are other embodiments as well.

What is claimed is:

1. A mobile device comprising:
a processor;
a wireless communication module, the wireless communication module being configured to connect to one or more wireless communication networks;
a display module, the display module being electrically coupled to the processor;
a mobile television module, the mobile television receiver module being configured to process television signals and send signals to the display module through a display bus;
an audio processing module configured to process audio signals;
a whip antenna being configured to operate at two or more lengths, the whip antenna being characterized by a length of about 80 mm to 180 mm, the two or more lengths comprising a first length, the first length being associated with a first television broadcast band;
a connection housing, the connection housing being disengageably coupled to a headset, the headset comprising a first audio cable, the audio cable being associated with first set of local maxima and a first frequency range, and the whip antenna being associated with a second set of local maxima and a second frequency range, the first frequency range including an RF broadcast frequency, the first frequency range and the second frequency range being different; and
a connector module electrically coupled to the connection housing, the first audio cable being coupled to the whip antenna through the connector module, the connector module being configured to separate television signals from audio signals for simultaneous reception from the headset and the whip antenna, the connector module being configured to receive the television signals from the whip antenna and transmit the television signals to the mobile television module, the connector module further being configured to receive the audio signals from the audio processing module and send the audio signals to the one or more audio cables, the connector module being positioned at least 10 mm away from the processor.

2. The device of claim 1 further comprising a shielding can enclosing the audio processing module.

3. The device of claim 1 wherein the connector housing is configured to accommodate a USB connector.

4. The device of claim 1 wherein the connector housing is configured to accommodate a 2.5 mm jack connector.

5. The device of claim 1 further comprising an LCD display coupled to the display module.

6. The device of claim 1 further comprising a memory module, the memory module being insulated from connector module.

7. The device of claim 1 wherein the connector module comprises one or more isolating elements.

8. The device of claim 7 wherein the one or isolating elements comprises one or more ferrite beads.

9. The device of claim 1 wherein the connector module comprises at least a shield trace electrically connecting the audio cables and the whip antenna, the shield trace being characterized by impedance of about 50 ohms.

10. The device of claim 1 wherein the connection housing is electrically coupled to a first ground and a PCB of the mobile device is electrically coupled to a second ground, the first ground and the second ground being insulated from each other.

11. A mobile device comprising:
a processor;
a wireless communication module, the wireless communication module being configured to connect to one or more wireless communication networks;
a mobile television module, the mobile television receiver module being configured to process television signals and send signals to the display module through a display bus;
an audio processing module configured to process audio signals;
a whip antenna being configured to operate at two or more lengths, the whip antenna being characterized by a length of about 80 mm to 180 mm, the two or more lengths comprising a first length, the first length being associated with a first television broadcast band;
a connection housing, the connection housing being disengageably coupled to a headset, the headset comprising a first audio cable, the audio cable being associated with a first frequency range and a first set of local maxima, and the whip antenna being associated with a second frequency range and a second set of local maxima, the first frequency range including an RF broadcast frequency, the first frequency range and the second frequency range being different; and
a connector module electrically coupled to the connection housing, the connector module comprising a plurality of filters for simultaneous reception from the headset and the whip antenna, the first audio cable being coupled to the whip antenna through the connector module, the connector module being configured to separate television signals from audio signals, the connector module being configured to receive the television signals from the whip antenna and transmit the television signals to the mobile television module, the connector module further being configured to receive the audio signals from the audio processing module and send the audio signals to the one or more audio cables, the connector module being positioned at least 10 mm away from the processor.

12. The device of claim 11 wherein the plurality of filters comprises ferrite bead elements and capacitor elements.

13. The device of claim 11 further comprises a speaker, the audio processing module being adapted to send audio signals to the speaker, the audio signals being based on RF signals received by the headset.

14. The device of claim 11 wherein the wireless communication module is configured to transfer data in GMS and/or CDMA protocols.

15. The device of claim 11 wherein the headset comprises a left audio channel, a right audio channel, a microphone channel, and a ground.

16. The device of claim 11 further comprising a keypad for receiving user inputs.

17. The device of claim 11 further comprising a battery and a power circuit.

18. The device of claim 11 further comprising a memory module.

19. A mobile device comprising:
- a battery module;
- a memory module;
- a processor electrically connected to the battery module;
- a wireless communication module, the wireless communication module being configured to connect to one or more wireless communication networks;
- a mobile television module, the mobile television receiver module being configured to process television signals and send signals to the display module through a display bus;
- an audio processing module configured to process audio signals;
- a whip antenna being configured to operate at two or more lengths, the whip antenna being characterized by a length of about 80 mm to 180 mm, the two or more lengths comprising a first length, the first length being associated with a first television broadcast band;
- a connection housing, the connection housing being disengageably coupled to a headset, the headset comprising a first audio cable, the audio cable being associated with a first frequency range and a first set of local maxima, and the whip antenna being associated with a second frequency range and a second set of local maxima, the first frequency range including an RF broadcast frequency, the first frequency range and the second frequency range being different and partially overlap; and
- a connector module electrically coupled to the connection housing, the connector module comprising a plurality of ferrite bead elements, the first audio cable being coupled to the whip antenna through the connector module, the connector module being configured to separate television signals from audio signals for simultaneous reception from the headset and the whip antenna, the connector module being configured to receive the television signals from the whip antenna and transmit the television signals to the mobile television module, the connector module further being configured to receive the audio signals from the audio processing module and send the audio signals to the one or more audio cables, the connector module being positioned at least 10 mm away from the processor.

20. The device of claim 19 wherein the connector module further comprising a plurality of capacitor elements.

* * * * *